United States Patent
Griffith, Jr. et al.

(10) Patent No.: US 9,765,241 B2
(45) Date of Patent: Sep. 19, 2017

(54) MULTILAYER PRESSURE SENSITIVE ADHESIVE

(71) Applicant: Rohm and Haas Company, Philadelphia, PA (US)

(72) Inventors: William B. Griffith, Jr., North Wales, PA (US); Melissa Lane, Lawrenceville, NJ (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 13 days.

(21) Appl. No.: 14/771,012

(22) PCT Filed: Mar. 3, 2014

(86) PCT No.: PCT/US2014/019835
§ 371 (c)(1),
(2) Date: Aug. 27, 2015

(87) PCT Pub. No.: WO2014/137878
PCT Pub. Date: Sep. 12, 2014

(65) Prior Publication Data
US 2016/0009957 A1   Jan. 14, 2016

Related U.S. Application Data

(60) Provisional application No. 61/772,206, filed on Mar. 4, 2013.

(51) Int. Cl.
*B32B 7/12* (2006.01)
*C09J 7/02* (2006.01)
*C09J 133/08* (2006.01)

(52) U.S. Cl.
CPC .......... *C09J 7/0246* (2013.01); *C09J 7/0217* (2013.01); *C09J 133/08* (2013.01); *C09J 2201/134* (2013.01); *C09J 2201/36* (2013.01); *C09J 2201/622* (2013.01); *C09J 2433/00* (2013.01)

(58) Field of Classification Search
None
See application file for complete search history.

(56) References Cited

U.S. PATENT DOCUMENTS

| | | | | |
|---|---|---|---|---|
| 4,833,179 A * | 5/1989 | Young | ................... | C09J 7/0217 522/183 |
| 5,164,444 A * | 11/1992 | Bernard | ................ | C08F 220/18 522/153 |
| 5,602,221 A | 2/1997 | Bennett et al. | | |
| 5,804,675 A | 9/1998 | Latiolais et al. | | |
| 5,827,609 A | 10/1998 | Ercillo et al. | | |
| 5,993,961 A | 11/1999 | Ugolick et al. | | |
| 6,045,895 A * | 4/2000 | Hyde | ........................ | B32B 7/02 428/213 |
| 6,183,862 B1 | 2/2001 | Ko et al. | | |
| 6,503,620 B1 * | 1/2003 | Xie | ........................... | B32B 7/06 427/208.4 |
| 6,547,887 B1 | 4/2003 | Ko et al. | | |
| 2006/0100357 A1 * | 5/2006 | Bunn | ..................... | C09J 133/04 524/556 |
| 2007/0059521 A1 * | 3/2007 | Nakamura | ................. | C09J 5/08 428/355 AC |
| 2010/0055435 A1 * | 3/2010 | Neubert | ..................... | C09J 5/02 428/220 |
| 2016/0009964 A1 * | 1/2016 | Griffith, Jr. | ............ | C09J 7/0217 428/354 |

FOREIGN PATENT DOCUMENTS

| | | |
|---|---|---|
| EP | 0384598 A1 | 8/1990 |
| EP | 1262532 A1 | 12/2002 |
| EP | 2573150 A1 | 3/2013 |
| JP | 2001254063 A | 9/2001 |

OTHER PUBLICATIONS

Zhou, "Study of Anchoring Behavior of Nematic Fluids at the Interface of Polymer-Dispersed Liquid Crystals," Ph.D. Dissertation, Georgia Institute of Technology (2003).
Bartholomew, "Acrylic Pressure Sensitive Adhesives Exhibiting Enhanced Adhesion to Low Surface Energy Substrates," Pressure Sensitive Tape Council Tech 34 Conference (2011).

* cited by examiner

*Primary Examiner* — Anish Desai
(74) *Attorney, Agent, or Firm* — Carl P. Hemenway

(57) ABSTRACT

Provided is a pressure sensitive adhesive article comprising
(a) a substrate (Sa),
(b) in contact with said substrate (Sa), a layer (Lb) of a composition (Cb) that comprises one or more acrylic polymer (POLb) having Tg of −10° C. or lower, and
(c) in contact with said layer (Lb), a layer (Lc) of a composition (Cc) that comprises one or more acrylic polymer (POLc) that comprises 20% to 90% polymerized units of one or more high-aliphatic vinyl monomer, by weight based on the weight of said polymer (POLc).

Also provided is a bonded article made by a process of contacting a substrate (Sd) with such a pressure sensitive adhesive article, wherein said substrate (Sd) is in contact with said layer (Lc).

5 Claims, 1 Drawing Sheet

MULTILAYER PRESSURE SENSITIVE ADHESIVE

Pressure sensitive adhesives (PSAs) that contain acrylic polymers have many desirable characteristics. For example, they generally have better resistance to chemical reagents and UV light than PSAs made from many other materials. It is often desired to provide a PSA that bonds well to polyolefin substrates. There is a need for PSAs that contain acrylic polymer, that show good adhesion to polyolefin substrates, and that have a relatively low amount of polymerized units of high-aliphatic vinyl monomer.

Eric Bartholomew, in "Acrylic Pressure Sensitive Adhesives Exhibiting Enhanced Adhesion to Low Surface Energy Substrates" (presented at the Pressure Sensitive Tape Council conference Tech 34 in 2011) teaches PSAs that have polymerized units of low solubility parameter Tg modifying monomers.

THE FOLLOWING IS A STATEMENT OF THE INVENTION

A first aspect of the present invention is a pressure sensitive adhesive article comprising
(a) a substrate (Sa),
(b) in contact with said substrate (Sa), a layer (Lb) of a composition (Cb) that comprises one or more acrylic polymer (POLb) having Tg of −10° C. or lower, and
(c) in contact with said layer (Lb), a layer (Lc) of a composition (Cc) that comprises one or more acrylic polymer (POLc) that comprises 20% to 90% polymerized units of one or more high-aliphatic vinyl monomer, by weight based on the weight of said polymer (POLc).

A second aspect of the present invention is a bonded article made by a process of contacting a substrate (Sd) with the article of the first aspect, wherein said substrate (Sd) is in contact with said layer (Lc).

THE FOLLOWING IS A BRIEF DESCRIPTION OF THE DRAWINGS

Figure 1:
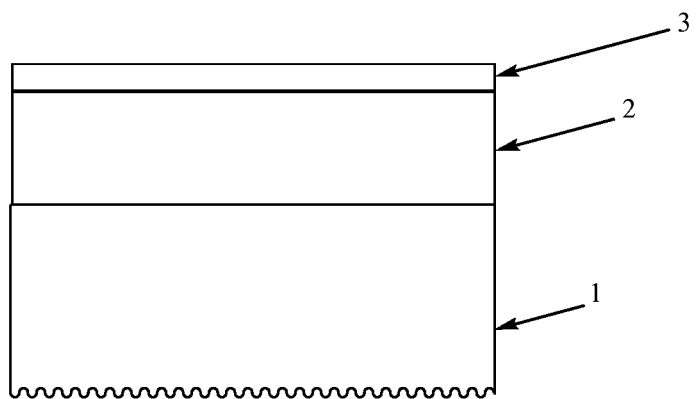

FIG. 1 is a vertical cross section of a pressure sensitive adhesive article of the present invention showing substrate (Sa) (1); layer (Lb) (2) of a composition (Cb), which contains one or more acrylic polymer (POLb) having Tg of −10° C. or lower; and layer (Lc) (3) of a composition (Cc), which contains 20% to 90% polymerized units of one or more high-aliphatic vinyl monomer, by weight based on the weight of polymer (POLc). FIG. 1 is not drawn to scale in any sense. For example, the size of the pressure sensitive adhesive article of the present invention in the horizontal direction shown in FIG. 1 may be larger by a factor of 1,000 or more than the size in the vertical direction shown in FIG. 1.

Figure 2:
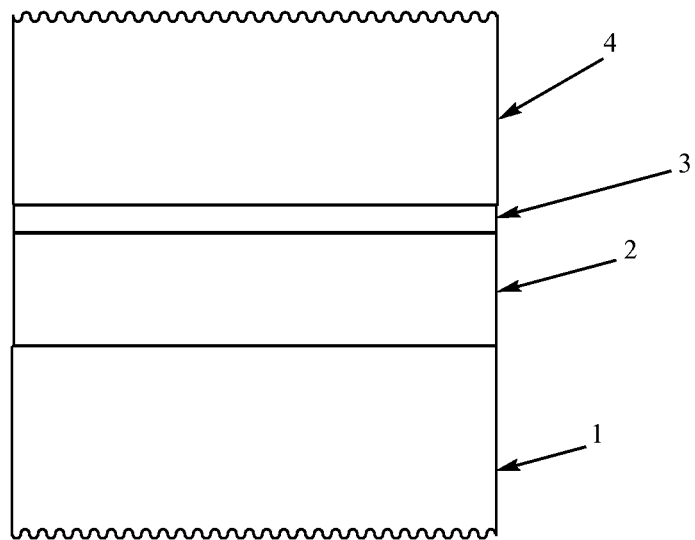

FIG. 2 (also not drawn to scale) depicts a preferred use to which the pressure sensitive adhesive article of the present invention may be put. FIG. 2 shows layer (Lc) (3) in contact with an additional substrate (Sd) (4).

The following is a detailed description of the invention.

As used herein, the following terms have the designated definitions, unless the context clearly indicates otherwise.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

As used herein, Dynamic Mechanical Analysis (DMA) refers to measurements made in shear geometry in the linear viscoelastic range at frequency of 1 sec$^{-1}$. DMA measures the elastic modulus (G'), the loss modulus (G"), and tandelta (the quotient found by dividing G" by G', synonymously called "tan (δ)"). A curve showing tandelta as a function of temperature is known herein as a "tandelta curve." Elastic modulus is reported herein in units of kilopascals (kPa).

The glass transition temperature (Tg) of a material is determined by differential scanning calorimetry using the midpoint method and temperature scan rate of 10° C. per minute according to test method ASTM D7426-08 (American Society of Testing and Materials, Conshohocken, Pa., USA).

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography or GPC). Polymers have weight-average molecular weight (Mw) of 1000 or more. Polymers may have extremely high Mw; some polymers have Mw above 1,000,000; typical polymers have Mw of 1,000,000 or less. Some polymers are crosslinked, and crosslinked polymers are considered to have infinite Mn.

As used herein "weight of polymer" means the dry weight of polymer.

Molecules that can react with each other to form the repeat units of a polymer are known herein as "monomers." The repeat units so formed are known herein as "polymerized units" of the monomer.

Vinyl monomers have the structure

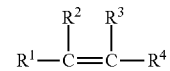

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Some suitable vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. In some embodiments, substituted monomers include, for example, monomers with more than one carbon-carbon double bond, monomers with hydroxyl groups, monomers with other functional groups, and monomers with combinations of functional groups. (Meth)acrylates are substituted and unsubstituted esters or amides of (meth)acrylic acid.

As used herein, acrylic monomers are monomers selected from (meth)acrylic acid, aliphatic esters of (meth)acrylic acid, aliphatic esters of (meth)acrylic acid having one or more substituent on the aliphatic group, (meth)acrylamide, N-substituted (meth)acrylamide, and mixtures thereof.

As used herein, a high-aliphatic vinyl monomer is a monomer that contains a carbon-carbon double bond that is capable of free-radical polymerization and also contains one or more high-aliphatic group "R2," where R2 is selected from iso-butyl, tert-butyl, and unsubstituted aliphatic groups having 5 or more carbon atoms. Aliphatic groups may be linear, branched, cyclic, multicyclic, or a combination thereof.

As used herein, vinylaromatic monomers are monomers selected from styrene, alpha-alkyl styrenes, and mixtures thereof.

As used herein, an "acrylic" polymer is a polymer in which 30% or more of the polymerized units are selected from acrylic monomers. The percentages are by weight based on the weight of the polymer.

As used herein, an olefin polymer is a polymer in which 70% or more of the polymerized monomer units are selected from hydrocarbon alkenes, hydrocarbon dienes, and mixtures thereof, by weight based on the weight of the polymer.

A tackifier is an organic compound having molecular weight of 500 to 10,000 and having glass transition temperature of 0° C. or higher.

A Pressure Sensitive Adhesive (PSA) is an adhesive that forms a bond with a substrate when pressure is applied to bring the adhesive and the substrate into contact. The bond forms without addition of further materials or the application of heat. As used herein, a pressure sensitive adhesive article is an article in which a pressure sensitive adhesive is adhered to a first substrate and in which a surface of the PSA (the "available surface") is available to make contact with a second substrate. The available surface of the PSA may or may not be in contact with a release material. A release material is a material that forms a weak bond with the PSA and may be easily removed so that the available surface is exposed.

A composition is herein considered to be "aqueous" if the composition contains water in the amount of 25% or more by weight based on the weight of the composition.

The present invention involves the use of a substrate, herein labeled substrate (Sa). The substrate (Sa) may be any material. Preferred are paper, polymer film, and metal foil. Among polymer films, preferred are polyester films. Among polymer films, preferred are those in which at least one side has been treated by corona discharge.

In contact with substrate (Sa) is a layer of a tackifier-free composition, herein referred to as composition (Cb). Composition (Cb) contains one or more polymer, herein referred to as polymer (POLb). Polymer (POLb) has Tg of −10° C. or lower; preferably −20° C. or lower; more preferably −30° C. or lower. Preferably polymer (POLb) has Tg of −100° C. or higher.

Preferably, the amount of tackifier in composition (Cb) is, by weight based on the dry weight of composition (Cb), less than 10%; more preferably 3% or less; more preferably 1% or less; more preferably zero.

Preferably, polymer (POLb) is an acrylic polymer. Preferably, the amount of polymerized units of acrylic monomers in polymer (POLb) is, by weight based on the weight of polymer (POLb), 50% or more; more preferably 70% or more; more preferably 90% or more; more preferably 99% or more. Preferably, polymer (POLb) has Mw of 10,000 or higher; more preferably 50,000 or higher.

Preferably, polymer (POLb) contains polymerized units of one or more of n-butyl acrylate (n-BA), ethyl acrylate (EA), isooctyl acrylate (i-OA), or a mixture thereof. As used herein, "isooctyl" is an unsubstituted alkyl group that contains exactly 8 carbon atoms in a branched configuration. The term "isooctyl" includes all branched isomers of 8-carbon alkyl groups and all mixtures of such isomers, including, for example, the 2-ethylhexyl group, dimethyl-hexyl groups, methyl-heptyl groups, trimethyl-pentyl, and mixtures thereof. Preferably, the sum of the amounts of polymerized units of n-BA, polymerized units of EA, and polymerized units of i-OA in polymer (POLb), by weight based on the weight of polymer (POLb), is 50% or more; more preferably 75% or more; more preferably 90% or more.

Preferably, every polymer in composition (Cb) that has Mw of 10,000 or higher is an acrylic polymer.

Preferably, the amount of polymerized units of high-aliphatic vinyl monomer in polymer (POLb) is 10% or less; more preferably 1% or less; more preferably zero.

Preferably, the amount of polymer (POLb) in composition (Cb), by weight based on the dry weight of composition (Cb), is 80% or more; more preferably 90% or more; more preferably 95% or more.

Preferably, composition (Cb) forms a continuous layer (Lb) on a face of substrate (Sa). Preferably, the thickness of the layer of composition (Cb) is 7.5 micrometer or more. Preferably, the thickness of the layer of composition (Cb) is 75 micrometer or less; more preferably 55 micrometer or less; more preferably 40 micrometer or less.

Preferably, composition (Cb) has the properties of a PSA. Preferably, composition (Cb) has elastic modulus of 20 kPa or higher over a temperature range that includes the range of 10° C. to 40° C. Preferably, composition (Cb) has elastic modulus over a temperature range that includes the range of 10° C. to 40° C. of 1,000 kPa or lower; more preferably 500 kPa or lower.

A layer of composition (Cc) is in contact with the layer (Lb) of composition (Cb). Composition (Cc) contains one or more polymer (POLc). Polymer (POLc) is an acrylic polymer that contains 20% to 90% of polymerized units of one or more high-aliphatic vinyl monomer, by weight based on the weight of polymer (POLc). Preferably, polymer (POLc) contains more than 40% of polymerized units of one or more high-aliphatic vinyl monomer, by weight based on the weight of polymer (POLc). Preferably, $R^2$ is selected from iso-butyl, tert-butyl, 2-ethylhexyl, alkyl groups having 8 to 18 carbon atoms, stearyl, isobornyl, and mixtures thereof. Preferably, $R^2$ is an unsubstituted alkyl group. More preferably, $R^2$ is isobutyl.

Preferably, the high-aliphatic vinyl monomer is selected from one or more high-aliphatic vinyl ester, one or more high-aliphatic (meth)acrylate, and mixtures thereof. High-aliphatic (meth)acrylates have structure (I):

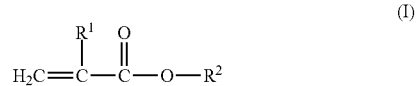

where $R^1$ is hydrogen or methyl, and $R^2$ is as defined above. Among high-aliphatic (meth)acrylates, preferably $R^1$ is hydrogen. High-aliphatic vinyl esters have the structure (II)

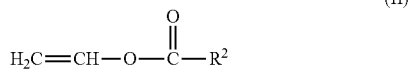

(II)

where $R^2$ is defined as above. Among high-aliphatic vinyl esters, preferred are those in which the number of carbon atoms in $R^2$ is 8 to 12. Preferably, the high-aliphatic vinyl monomer contains one or more high-aliphatic (meth)acrylate. More preferably, every high-aliphatic vinyl monomer is a high-aliphatic (meth)acrylate.

Preferably polymer (POLc) has Tg of 0° C. or lower; more preferably −10° C. or lower. Preferably polymer (POLc) has Tg of −100° C. or higher.

Preferably, polymer (POLc) contains polymerized units of acrylic monomers in the amount, by weight based on the weight of polymer (POLc), 50% or more; more preferably 75% or more; more preferably 90% or more; more preferably 98% or more.

Preferably, the amount of all tackifiers in composition (Cc), by weight based on the dry weight of composition (Cc), is 10% or less; more preferably 3% or less; more preferably zero.

Preferably, composition (Cc) has the properties of a PSA. Preferably, composition (Cc) has elastic modulus of 20 kPa or higher over a temperature range that includes the range of 10° C. to 40° C. Preferably, composition (Cc) has elastic modulus over a temperature range that includes the range of 10° C. to 40° C. or 1,000 kPa or lower; more preferably 500 kPa or lower.

Preferably, the thickness of the layer of composition (Cc) is 1.25 micrometer or more. Preferably, the thickness of the layer of composition (Cc) is 25 micrometer or less; more preferably 10 micrometer or less; more preferably 5 micrometer or less.

Preferably the total amount of polymerized units of high-aliphatic vinyl monomer in the pressure sensitive adhesive article of the present invention is, by weight based on the sum of the weights of composition (Cb) and composition (Cc), 10% or less; more preferably 2% or less. Preferably the total amount of polymerized units of high-aliphatic vinyl monomer in the pressure sensitive adhesive article of the present invention is, by weight based on the sum of the weights of composition (Cb) and composition (Cc), 0.1% or more; more preferably 0.3% or more.

Also contemplated are embodiments in which composition (Cb) contains polymerized units of one or more monomer of structure (I) in which $R^1$ is hydrogen $R^2$ is an unsubstituted alkyl group having exactly 8 carbon atoms. Among such embodiments, it is contemplated that composition (Cb) contains no polymerized units of any high-aliphatic monomer other than one or more monomer of structure (I) in which $R^1$ is hydrogen $R^2$ is an unsubstituted alkyl group having exactly 8 carbon atoms. Among such embodiments, composition (Cc) will contain polymerized units of one or more of iso-butyl acrylate, t-butyl acrylate, monomers of structure (I) in which $R^2$ is an unsubstituted alkyl group having more than 8 carbon atoms, and mixtures thereof; preferably iso-butyl acrylate, t-butyl acrylate, isobornyl (meth)acrylate, and mixtures thereof. Among such embodiments, the preferred amounts of polymerized units high-aliphatic monomer in composition (Cc) is as described above.

Either composition (Cb) or composition (Cc) may independently of each other contain one or more additional ingredients. Preferably such additional ingredients are chosen to improve the performance of the PSA article. Typical additional ingredients include plasticizers, fillers, thickeners, pigments, antioxidants, UV stabilizers, defoamers, surfactants, and mixtures thereof.

Preferably, the weight ratio of composition (Cb) to composition (Cc) is 1.01:1 or greater; more preferably 2:1 or greater; more preferably 4:1 or greater; more preferably 6:1 or greater. Preferably, the weight ratio of composition (Cb) to composition (Cc) is 20:1 or less; more preferably 15:1 or less; more preferably 10:1 or less.

The layer of composition (Cb) may be applied to substrate (Sa) by any method. Preferably, an aqueous composition (Cb1) is formed that contains particles of polymer (POLb) dispersed in an aqueous continuous medium. Preferably, composition (Cb1) is formed by aqueous emulsion polymerization to form a latex of particles of polymer (POLb). Preferably, the median particle size of the particles of polymer (POLb) is from 50 nm to 750 nm. Preferably, the amount of water in the continuous medium, by weight based on the weight of the continuous medium, is 75% or more; more preferably 90% or more.

One or more optional additional ingredients may be added to aqueous composition (Cb1). A layer of aqueous composition (Cb1) may be applied to substrate (Sa) by any method. Preferred methods are slide coating, curtain coating, and slot die coating.

After a layer (Lb1) of aqueous composition (Cb1) is applied to substrate (Sa), the layer of aqueous composition (Cb1) may be dried or allowed to dry. That is, the water may be removed from the layer of aqueous composition (Cb1) to form a dry coating. Water is preferably removed by the application of heat or moving air or both.

The layer (Lc) of composition (Cc) may be applied to the layer of composition (Cb) by any method. Preferably, an aqueous composition (Cc1) is formed that contains contains particles of polymer (POLc) dispersed in an aqueous medium. Preferably, the median particle size of the particles of polymer (POLc) is from 50 nm to 750 nm. Preferably, the amount of water in the continuous medium, by weight based on the weight of the continuous medium, is 75% or more; more preferably 90% or more. One or more optional additional ingredients may be added to aqueous composition (Cc1).

A layer (Lc1) of aqueous composition (Cc1) may be applied to the layer of composition (Cb) by any method. Preferred methods are slide coating, curtain coating, and slot die coating. A layer of aqueous composition (Cc1) may either be applied to a wet layer of aqueous composition (Cb1) or applied to a dry layer of composition (Cb).

In some embodiments, after a layer (Lb1) of aqueous composition (Cb1) is applied to substrate (Sa) and dried, then a layer (Lc1) of aqueous composition (Cc1) is applied to the dry layer of composition (Cb), and then the layer (Lc1) of aqueous composition (Cc1) is dried.

In some embodiments, a layer (Lb1) of aqueous composition (Cb1) is applied to substrate (Sa) and, while the layer (Lb1) of aqueous composition (Cb1) is still wet, a layer (Lc1) of aqueous composition (Cc1) is applied on top of the layer (Lb1) of aqueous composition (Cb1), and then the entire ensemble is then dried. Among such embodiments, it is preferred that a multilayer coating device is used that simultaneously applies a layer (Lb1) of aqueous composition (Cb1) to substrate (Sa) and also applies a layer (Lc1) of aqueous composition (Cc1) onto the layer (Lb1) of aqueous composition (Cb1), and then the entire ensemble is dried. One suitable coating device is a slide coater. A slide coater forms a liquid composite in which there is a layer (Lb1) of aqueous composition (Cb1) underneath a layer (Lc1) of aqueous composition (Ca); while keeping those layers intact, the slide coater applies a layer of the entire composite onto a substrate (Sa) in a way that brings layer (Lb1) into contact with substrate (Sa) and leaves layer (Lc1) in contact with air; then the entire article is dried to remove water from the aqueous compositions. Also contemplated are transfer coating methods, for example methods that involve making a coating layer of composition (Cb) on a release liner, then making a coating layer of composition (Cc) on top of the layer of composition (Cb), then contacting the layer of composition (Cc) with substrate (Sa) (preferably under pressure), and then removing the release liner.

While the present invention is not bound by any theory, it is contemplated that one reason why typical acrylic PSAs often have adhesion to polyolefin surfaces that is considered to be poor is that acrylic polymers have many chemical groups on the chain that are relatively polar. It is contemplated that the surface of a typical acrylic PSA has a relatively high surface energy as a result. In contrast, polyolefin surfaces are comparatively non-polar and are considered to have relatively low surface energy. It is contemplated that this mismatch of surface energy values prevents the typical acrylic PSA from effectively wetting the surface of the polyolefin (i.e., from making intimate contact on a molecular scale). It is contemplated that the presence of polymerized units of high-aliphatic vinyl monomer provides a lower surface energy on the surface of the PSA, thereby improving wetting of the polyolefin surface, which it turn improves adhesion to polyolefin surfaces.

It is contemplated that the pressure sensitive adhesive article of the present invention will be put to use by bringing it into contact with an additional substrate (Sd). It is contemplated that pressure will be applied to bring composition (Cc) and substrate (Sd) into intimate contact and then released. It is contemplated that the result will be a bonded article in which the pressure sensitive adhesive article is still intact and in which composition (Cc) is bonded with substrate (Sd). Substrate (Sd) may be any substance. Preferably, Substrate (Sd) is a polyolefin. Preferably, substrate (Sd) has Tg of 50° C. or higher.

THE FOLLOWING ARE EXAMPLES OF THE PRESENT INVENTION

The materials used in the following examples are as follows.

| Label | Description | Polymerized units[1] |
|---|---|---|
| PSA-L | PSA, low-shear type, aqueous acrylic polymer latex. | more than 95%: mixture of BA and EA remainder: other acrylic monomers |
| PSA-H | PSA, high-shear type, aqueous acrylic polymer latex. | more than 95%: mixture of BA and EA remainder: other acrylic monomers |
| PSA-HI-A | PSA, aqueous acrylic polymer latex. | more than 40%: iso-butyl acrylate remainder: other acrylic monomers |

| Label | Description | Polymerized units[1] |
|---|---|---|
| PET | polyethylene terephthalate film, thickness 50.8 μm, supplied by Adhesives Consultants | |
| HDPE | high density polyethylene, supplied by Adhesives Consultants | |

Note
[1] by weight based on the weight of the PSA

The HDPE Peel test was PSTC Test Method 101 (Pressure Sensitive Tape council, Naperville, Ill., USA), with test substrate of HDPE, 20 minutes dwell time, at 180°, reported in units of Newtons per 25 mm of width (N/25 mm).

The SS Shear test was PSTC Test Method 107 (Pressure Sensitive Tape council, Naperville, Ill., USA), with test substrate of stainless steel, test area was 25 mm×25 mm, mass was 1 kg. The results reported are time to failure (the symbol ">" means that the test was stopped prior to failure at the time shown).

Single-layer PSAs were made as follows. A layer of PSA-L was applied to the corona-treated side of PET film. The coating was then dried by placing in an oven at 80° C. for 5 minutes. Dry thickness was 22.5 micrometers.

Two-layer PSAs were made as follows. A layer of PSA-L was applied and dried as in the single-layer PSA method. Thickness of the dry first coating was 20.0 micrometers. Then a layer of PSA-HI-A was applied and dried as in the single-layer PSA method. Thickness of the dry second coating was 2.5 micrometers.

Example 1: Modification of a Low-Shear Adhesive

The results were as follows.

| Type | HDPE Peel (N/25 mm) | SS Shear (hours) |
|---|---|---|
| single layer (comparative) | 3.9 | 4.6 |
| Two-Layer | 6.1 | 11.6 |

The two-layer example of the present invention shows improvements in both peel strength on HDPE and in shear bonding to stainless steel.

Example 2: Modification of a High-Shear Adhesive

Coatings were made as in Example 1 except that in all cases PSA-H was used in place of PSA-L.

The results were as follows.

| Type | HDPE Peel (N/25 mm) | SS Shear (hours) |
|---|---|---|
| single layer (comparative) | 1.2 | 58.5 |
| Two-Layer | 4.1 | 4.0 |

The two-layer example of the present invention shows improvements in peel strength on HDPE and retains a useful degree of shear bonding to stainless steel.

The invention claimed is:

1. A pressure sensitive adhesive article comprising
   (a) a substrate (Sa),
   (b) in contact with said substrate (Sa), a layer (Lb) of a pressure-sensitive adhesive composition (Cb) that comprises one or more acrylic polymer (POLb) having Tg of −10° C. or lower, and
   (c) in contact with said layer (Lb), a layer (Lc) of a composition (Cc) that comprises one or more acrylic polymer (POLc) that comprises 20% to 90% polymerized units of one or more high-aliphatic vinyl monomer, by weight based on the weight of said polymer (POLc), wherein said high-aliphatic vinyl monomer is selected from the group consisting of structure (I), structure (II), and mixtures thereof, wherein structures (I) and (II) are

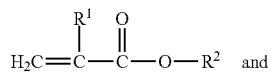 (I)

and

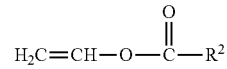 (II)

wherein R$^1$ is hydrogen or methyl, and R$^2$ is selected from iso-butyl, tert-butyl, 2-ethylhexyl, alkyl groups having 8 to 18 carbon atoms, stearyl, isobornyl, and mixtures thereof;
wherein said acrylic polymer (POLb) comprises 10% or less by weight of said high-aliphatic vinyl monomer.

2. The article of claim 1, wherein said high-aliphatic vinyl monomer is a structure (I).

3. The article of claim 1, wherein said acrylic polymer (POLb) comprises polymerized units of n-butyl acrylate, iso-octyl acrylate, or a mixture thereof.

4. A bonded article made by a process of contacting a substrate (Sd) with the article of claim 1, wherein said substrate (Sd) is in contact with said layer (Lc).

5. The bonded article of claim 4, wherein said substrate (Sd) is a polyolefin.

* * * * *